(12) United States Patent
Larsen

(10) Patent No.: US 12,430,811 B1
(45) Date of Patent: Sep. 30, 2025

(54) OPTIMIZED DYNAMIC CONTENT LOADING SYSTEMS AND METHODS

(71) Applicant: MFTB Holdco, Inc., Seattle, WA (US)

(72) Inventor: Josh Larsen, Seattle, WA (US)

(73) Assignee: MFTB HOLDCO, INC., Seattle, WA (US)

( * ) Notice: Subject to any disclaimer, the term of this patent is extended or adjusted under 35 U.S.C. 154(b) by 154 days.

(21) Appl. No.: 17/858,809

(22) Filed: Jul. 6, 2022

Related U.S. Application Data

(60) Provisional application No. 63/219,122, filed on Jul. 7, 2021.

(51) Int. Cl.
| | |
|---|---|
| *G06T 11/00* | (2006.01) |
| *G06F 9/445* | (2018.01) |
| *G06F 16/957* | (2019.01) |
| *H04L 67/02* | (2022.01) |
| *H04L 67/52* | (2022.01) |

(52) U.S. Cl.
CPC .......... *G06T 11/00* (2013.01); *G06F 9/44521* (2013.01); *G06F 16/9574* (2019.01); *H04L 67/02* (2013.01); *H04L 67/52* (2022.05); *G06T 2210/52* (2013.01)

(58) Field of Classification Search
CPC ...... G06T 11/00; G06F 16/9538; G06F 9/445; G06F 16/9574; G06F 9/44521; H04L 67/52; H04L 67/02
See application file for complete search history.

(56) References Cited

U.S. PATENT DOCUMENTS

| | | | |
|---|---|---|---|
| 8,095,434 B1 * | 1/2012 | Puttick | G06Q 30/0639 705/26.9 |
| 2022/0130296 A1 * | 4/2022 | Kamiya | B60K 35/235 |

FOREIGN PATENT DOCUMENTS

CN 110866204 B * 4/2023

\* cited by examiner

*Primary Examiner* — Weiming He
(74) *Attorney, Agent, or Firm* — Merchant & Gould P.C.

(57) ABSTRACT

System and methods facilitating optimized dynamic content loading are disclosed. To improve the user experience associated with loading dynamic content (e.g., content that adapts to user specific information), the system uses static content corresponding to the dynamic content to be presented to the user as the dynamic content loads. The system receives a user request to load a webpage associated with dynamic content and obtains static content associated with the dynamic content. The system then generates for display, the static content and then obtains the dynamic content corresponding to the static content. The system then generates for display, the dynamic content by displaying the dynamic content over the static content.

18 Claims, 7 Drawing Sheets

OPTIMIZED DYNAMIC CONTENT LOADING SYSTEMS AND METHODS

CROSS-REFERENCE TO RELATED APPLICATION(S)

This application claims the benefit of U.S. Provisional Patent Application No. 63/219,122, filed Jul. 7, 2021. The content of the foregoing application is incorporated herein in its entirety by reference.

BACKGROUND

Loading and presenting dynamic content (e.g., adaptive content) is often based user specific data, changes to the user specific data, and subsequently generating content based on the changed user specific data. However, current systems are unable to efficiently load such dynamic content. For instance, due to its dynamic nature, each time a request is made for dynamic content, a server must perform the steps of checking to see what data the dynamic content is based on, what user specific data has changed, and then subsequently load the dynamic content for presentation to a user. The user waiting for such steps to be performed may be presented with no content or a blank webpage-thereby causing a poor user experience. These and other drawbacks exist.

Figure 1:
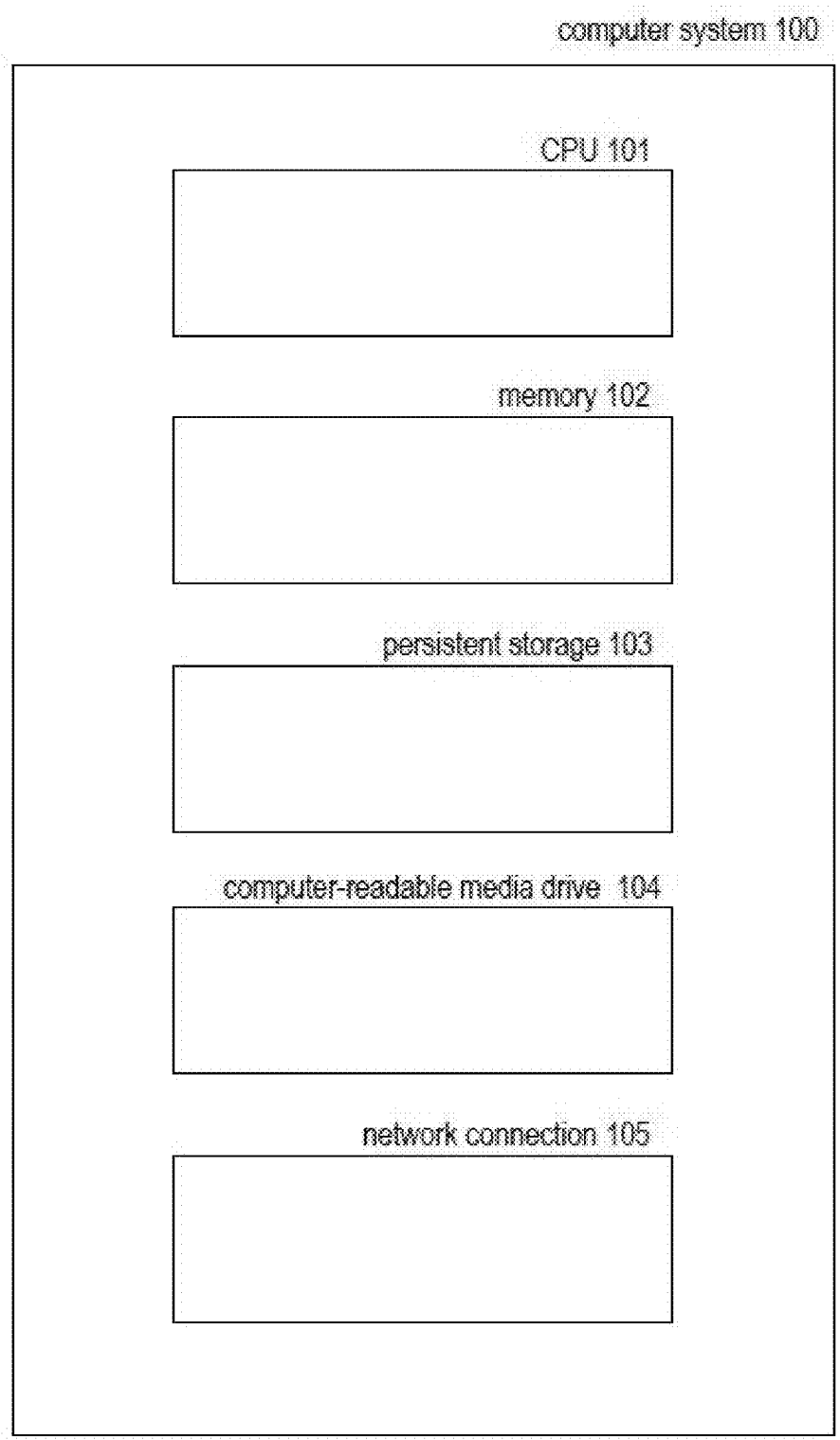
FIG. 1 is a block diagram showing some of the components typically incorporated in at least some of the computer systems and other devices on which the disclosed system operates in accordance with some implementations of the present technology.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

Dynamic content (aka adaptive content) refers to web content that changes based on the behavior, preferences, and interests of the user. It refers to websites as well as e-mail content and is generated at the moment a user requests a page. Dynamic content is personalized and adapts based on the data you have about the user and on the access time, its goal being to deliver an engaging and satisfying online experience for the visitor.

Generally powered by applications and scripts, dynamic content works in tandem with static content. A classic example is the HTML content of a landing page or of an e-mail that changes to display information that is relevant for the viewer based on location or previous interactions with the website. An e-mail where the user's name is retrieved from the database and inserted automatically via HTML text is another example of dynamic content.

As an example, existing systems and methods for loading dynamic content (e.g., dynamic map) perform the following steps: (1) retrieve and preload data for the dynamic map; (2) load other information on webpage (e.g., images, search results, etc.); (3) initialize dynamic map; (4) request map results; and (5) render map results. As a result, loading dynamic content (e.g., on a webpage) consumes extensive computing resources (e.g., processing and memory resources). For example, loading data for a dynamic map that displays indicators (e.g., pins/dots) of homes available for sale in a geographic region requires generating and executing queries to identify the for-sale properties, apply any user specific filters, and display the map of the geographic area and the identified indicators In addition, loading dynamic content takes more time-resulting in a lag between start of page load to end of page load and a degraded user experience. In fact, the largest contentful paint (LCP) value for dynamic content tends to be very high. Existing systems are thus slow and require intensive computing resource utilization to render dynamic content.

To overcome these and other deficiencies of existing systems, the inventor has conceived and reduced to practice systems and methods for optimized loading of dynamic content. The optimized dynamic content loading systems and methods optimize both processing and memory resources when rendering/loading dynamic content, as well as optimize the number of access calls (e.g., via an API) to a server for dynamic content. Furthermore, the inventors have developed an improved user interface leading to an improved user experience. For instance, whereas conventional systems may simply wait for dynamic content to be completely loaded, displayed, or rendered on a user interface, which may cause empty content to appear to the user (e.g., a blank user interface, an empty user interface, etc.), the inventors have improved the user interface by displaying a static version of dynamic content during the time at which the dynamic content is being retrieved and/or loaded.

In various implementations, the methods and systems described herein can facilitate optimized dynamic content loading. Using user specific data, dynamic content, and static content, the methods and systems optimize the loading of dynamic content in a more efficient matter saving time, energy, and valuable computer processing resources. For example, the optimized dynamic content loading system receives a request to load dynamic content. Based on the request, the system first obtains static content corresponding to the dynamic content (e.g., a static image), displays the static content while loading other information associated with the webpage (e.g., header, footer, etc.), and in the background generate request(s) for the dynamic content. The system can then obtain the dynamic content and display the dynamic content over the static content such that the dynamic content replaces the static content. In some implementations, the optimized dynamic content loading system requests dynamic content and obtains & displays dynamic content in parallel.

In the following description, for the purposes of explanation, numerous specific details are set forth in order to provide a thorough understanding of implantations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Suitable Computing Environments

FIG. 1 is a block diagram showing some of the components typically incorporated in at least some of the computer systems and other devices on which the disclosed system operates. In various implementations, these computer systems and other devices 100 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: a central processing unit (CPU) 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; computer-readable media drives 104 (e.g., at least one non-transitory computer-readable medium) that are tangible storage means that do not include a transitory, propagating signal, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
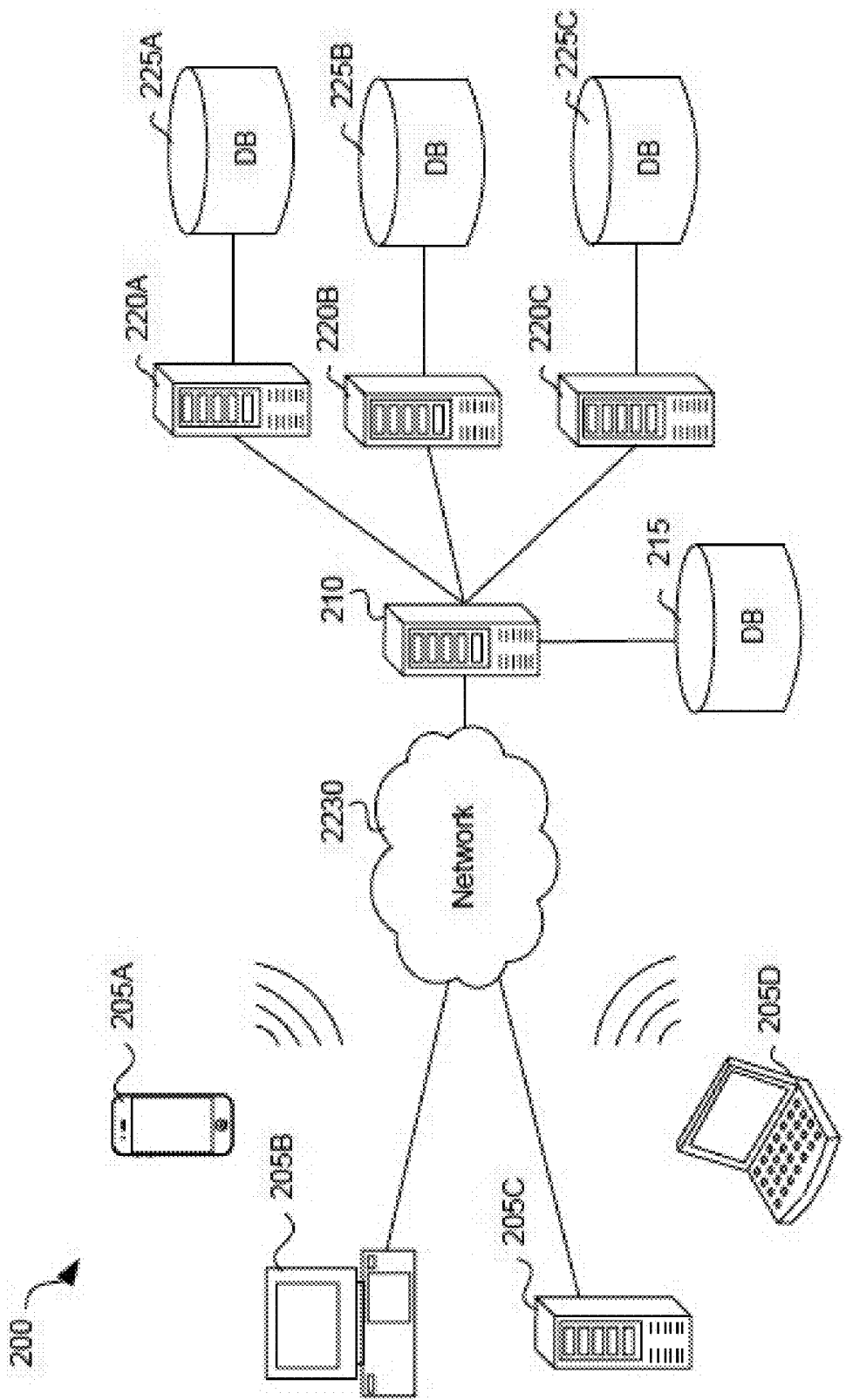
FIG. 2 is a system diagram illustrating an example of a computing environment in which the disclosed system operates in some implementations of the present technology.

FIG. 2 is a system diagram illustrating an example of a computing environment in which the disclosed system operates in some implementations. In some implementations, environment 200 includes one or more client computing devices 205A-D, examples of which can host the system 100. For example, the computing devices 205A-D can comprise distributed entities 1-4, respectively. Client computing devices 205 operate in a networked environment using logical connections through network 2230 to one or more remote computers, such as a server computing device.

In some implementations, server computing device 210 is an edge server which receives client requests and coordinates fulfillment of those requests through other servers, such as servers 220A-C. In some implementations, server computing devices 210 and 220 comprise computing systems, such as the system 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server or client devices. In some implementations, servers (210, 220A-C) connect to a corresponding database (215, 225A-C). As discussed above, each server 220 can correspond to a group of servers, and each of these servers can share a database or can have its own database. Databases 215 and 225 warehouse (e.g., store) information such as static content (e.g., map images, email templates, video thumbnails, etc.), dynamic content (e.g., real estate listings, home information, recent sales, home attributes, particular homes, subject homes, comparable homes, home data, actual values of homes, estimated values of homes, font, user-preference formatting, etc.), static content identifiers, dynamic content identifiers, mapping between static and dynamic content identifiers, and so on.

Though databases 215 and 225 are displayed logically as single units, databases 215 and 225 can each be a distributed computing environment encompassing multiple computing devices, can be located within their corresponding server, or can be located at the same or at geographically disparate physical locations.

Network 2230 can be a local area network (LAN) or a wide area network (WAN), but can also be other wired or wireless networks. In some implementations, network 2230 is the Internet or some other public or private network. Client computing devices 205 are connected to network 2230 through a network interface, such as by wired or wireless communication. While the connections between server computing device 210 and server computing device 220 are shown as separate connections, these connections can be any kind of local, wide area, wired, or wireless network, including network 2230 or a separate public or private network.

Optimized Dynamic Content Loading

Figure 3:
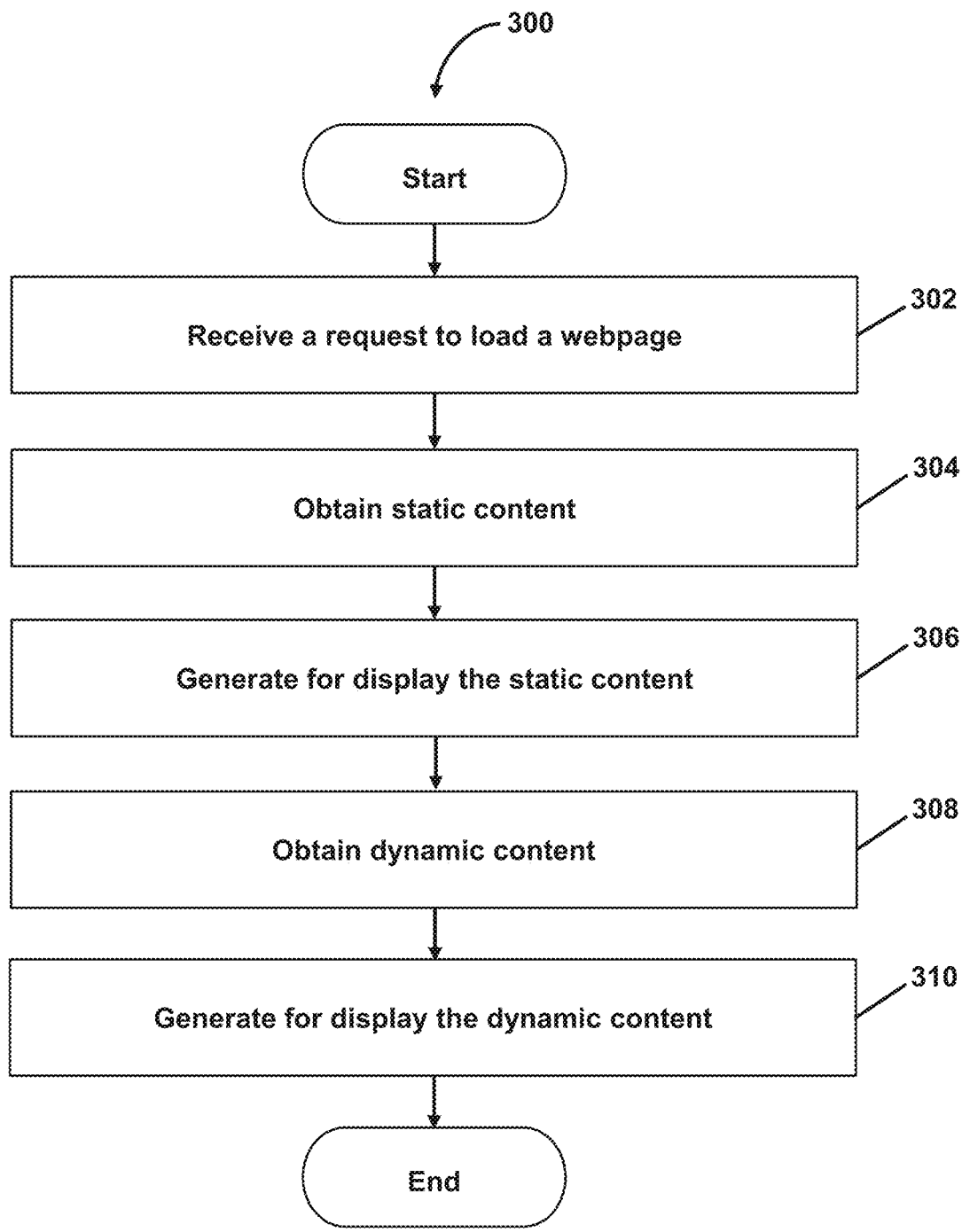
FIG. 3 is a flow diagram illustrating a process of loading optimized dynamic content, in accordance with some implementations of the present technology.

FIG. 3 is a flow diagram illustrating a process 300 of loading optimized dynamic content, in accordance with some implementations of the present technology. At act 302, process 300 performs receiving a request to load a webpage. For example, process 300 receives a user request to load a webpage associated with/comprising dynamic content. The webpage may be any webpage associated with a website, company, service provider, or other entity. The webpage can comprise a multitude of content such as text, images, videos, audio, other multimedia, static content, dynamic content, or other content.

Dynamic content can be associated with user specific information. For example, the user specific information may include demographic information, financial information, location information, a name, user device identifiers associated with the user (e.g., user devices the user uses), medical information, or other user specific information. Dynamic content can be adaptive content that changes based on user specific information. In some implementations, dynamic content is also associated with static content. For example, dynamic content corresponds to static content. Static content can refer to content that does not change with respect to user specific information. As an example, static content refers to content such as an image, a video, audio, text, a contract, or other content. Static content can also be content that is not adaptive with respect to user specific information. Dynamic content and static content work in tandem with one another to provide a user with feature rich content.

As an example, a user may request to load a webpage that is associated with dynamic content. The dynamic content may be a geographic map that includes a location of the user and/or a geographic area selected by a user (e.g., zip code). However, the dynamic content may take some time to load (e.g., 1 ms, 2 ms, 3 ms, etc.). In lieu of presenting an empty webpage (e.g., a webpage without one or more visual elements) to a user, to improve the user experience, static content can first be displayed to the user as the webpage loads (e.g., such that the user visually sees an image of a map). Upon successful loading of the dynamic content (e.g., in the background) including the user specific information, the dynamic content may be displayed (e.g., superimposed on the static content).

As another example, a user may request to generate an email via an email client. The email client may have user specific information stored (e.g., in a database associated with the email client) such as user preferences pertaining to a user specified signature, font color, font size, body, embedded image, or other email element. As such, when the user requests to generate a new email, static content can be presented to the user, such as a default email with one or more default email elements. Upon the dynamic content loading, the dynamic content can then be presented to the user including the user specific information, such as the user specified signature, font color, font size, or other email elements the user has specified.

To provide users with feature rich webpage content, a user device (e.g., client device 205) associated with a user can be configured to transmit HTTP requests to a server (e.g., server 210) over a network (e.g., network 2230) associated with a remote database (e.g., database 215). Such HTTP requests may comprise a request to load a webpage associated with dynamic content. Network 2230 can transmit HTTP messages (E.g., requests and responses) between the user device associated with the user and the server to provide the user with feature rich webpage content. As an example, the user device transmits a request to the server, and the server transmits back a response to the request. For example, the user device can transmit a request to load a webpage associated with the dynamic content.

At act 304, process 300 obtains static content associated with the dynamic content. For instance, process 300 can access a remote data store, based on a user request (e.g., requesting a webpage associated with dynamic content), to obtain static content that corresponds to the dynamic content.

In one use case, where dynamic content is a dynamic map, such as a dynamic geographic map that is based on user specific information (e.g., a location of the user), process 300 obtains a static image of the geographic map. Such static image of the geographic map may not include one or more user specific information elements (e.g., a pin indicating the user's location) but may include a general image of the geographic map (e.g., a static image of a city map). For example, process 300 can access a remote data store (e.g., database 215) to obtain a static image of the dynamic geographic map.

In another use case, where the dynamic content is an online dynamic contract (e.g., where the contract includes the user's name in one or more portions of the contract), process 300 can obtain a default contract that corresponds to the dynamic contract. For instance, the default contract may be a licensing agreement for the user without one or more name portions filled out that correspond to the user. As such, to avoid presenting empty content to a user, process 300 retrieves a default contract to be displayed to the user while the dynamic contract is obtained and generated for display to the user.

In some implementations, obtaining the static content associated with the dynamic content can be based on an identifier associated with the request. For instance, each request that a user device transmits to a server may include one or more identifiers to retrieve content. Database 215 may store content (e.g., static content and dynamic content) that is associated with a identifiers such that when requests are received, content may be obtained and transmitted back to the user device. For example, dynamic content may be associated with a dynamic-content-identifier value and a static-content-correspondence value. The dynamic-content-identifier value indicates an identifier that identifies dynamic content (e.g., what the dynamic content is, such as a map, a contract, an email template, etc.). The static-content-correspondence value indicates static content that corresponds to the dynamic content. Such dynamic-content-identifier values and static-content-correspondence values may be in the form of integers, hexadecimal values, binary values, alphanumeric strings, or other value that may identify content. Moreover, static content may have a dynamic-content-correspondence value that is the same as the static-content-correspondence value such that the dynamic content and static content are linked together (e.g., correspond to one another).

As such, process 300 can compare the identifier associated with the user request to other identifiers associated with the content stored in database 215. For instance, the identifier associated with the user request may indicate a dynamic-content-identifier value. Process 300 may compare the dynamic-content-identifier to dynamic-content-identifiers stored in database 215 to determine a match. Based on a matching of dynamic-content-identifier associated with the user request to a dynamic-content-identifier stored in database 215, process 300 obtains static content associated with the dynamic content. For example, process 300 may determine based on the match, a static-content-correspondence value associated with the dynamic-content-identifier (e.g., of the dynamic-content-identifier of the user request) to obtain the static content that corresponds to the dynamic content.

In some implementations, obtaining the static content associated with the dynamic content comprises generate the static content by issuing one or more queries. For example, process 300 can generate a static image of a map region by selecting a portion of a map corresponding to the user request (e.g., inquiry for all homes for sale in a geographic region).

At act 306, process 300 generates for display, the static content associated with the dynamic content. For example, in response to a request to load a webpage associated with dynamic content, upon obtaining the static content (at act 304) corresponding to the dynamic content, process 300 generates for display the static content on a user interface associated with the user device. The user interface can be a web-based graphical user interface (GUI) presented via a web-browser (or other user device application) configured to display content at a user device.

Figure 4:
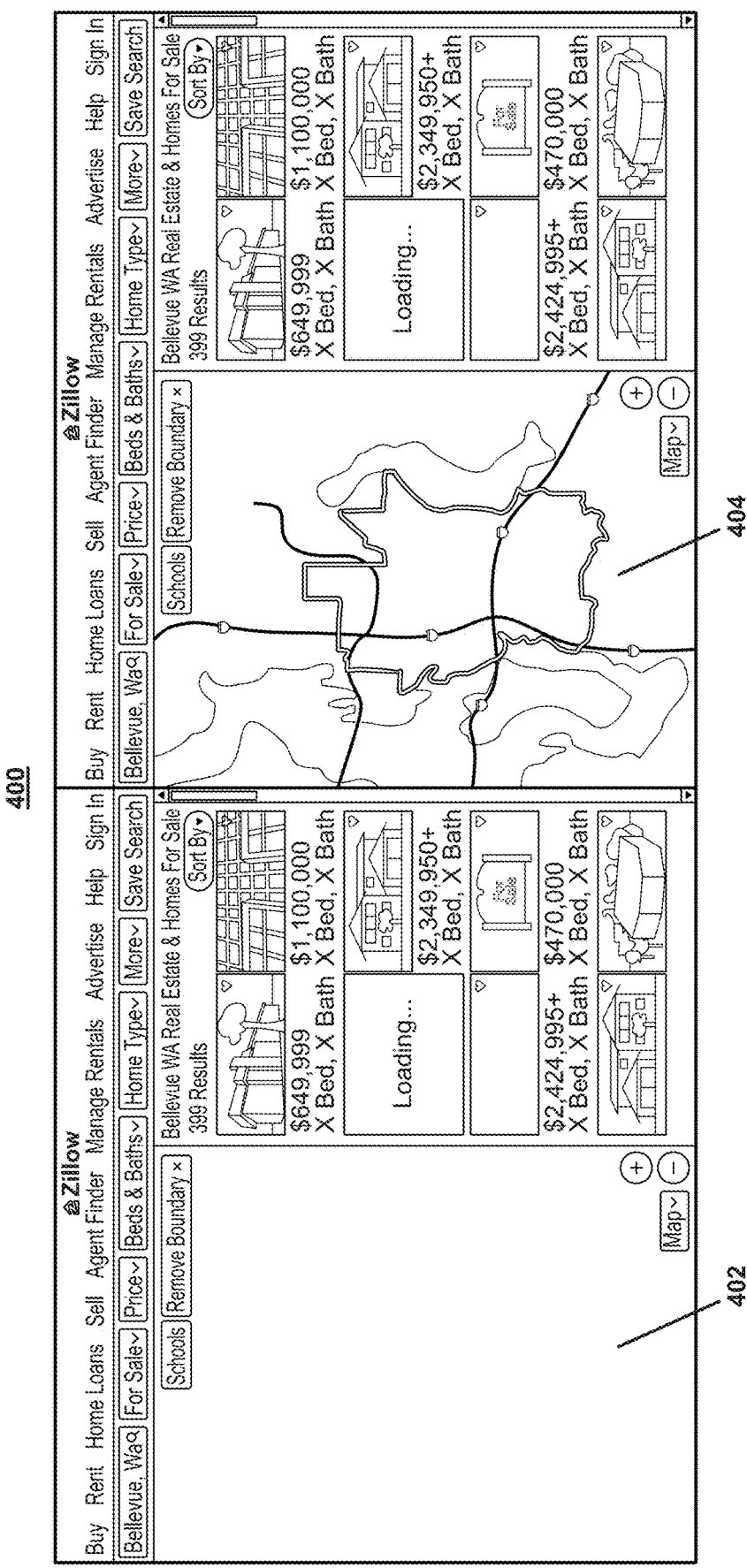
FIG. 4 shows a user interface illustrating static content and dynamic content, in accordance with some implementations of the present technology.

To improve the user's experience, static content is presented (e.g., to a user via a user interface associated with a user device) while retrieving and displaying the requested dynamic content. That is, during a first time period during which the webpage continues to load (e.g., not finished with loading), the optimized dynamic content loading system first loads and presents the static content that corresponds to the dynamic content. To clarify, the first time period represents a time period where at least some of the content associated with a webpage (e.g., dynamic content, images, text, videos, scripts, or other content) is not finished loading. Conventional systems do not display any content until the requested dynamic content is retrieved, loaded, and displayed on the user interface. However, doing so results in a poor user experience as the user sees an empty/blank portion of a user interface while waiting for such dynamic content to finish loading and subsequently be displayed to the user. For example, conventional systems show a large white area (or other empty portion of a user interface) while initializing the dynamic map content. For example, referring to FIG. 4, conventional systems display incomplete dynamic content 402 to the user during the first time period as opposed to static content 404.

Figure 5:
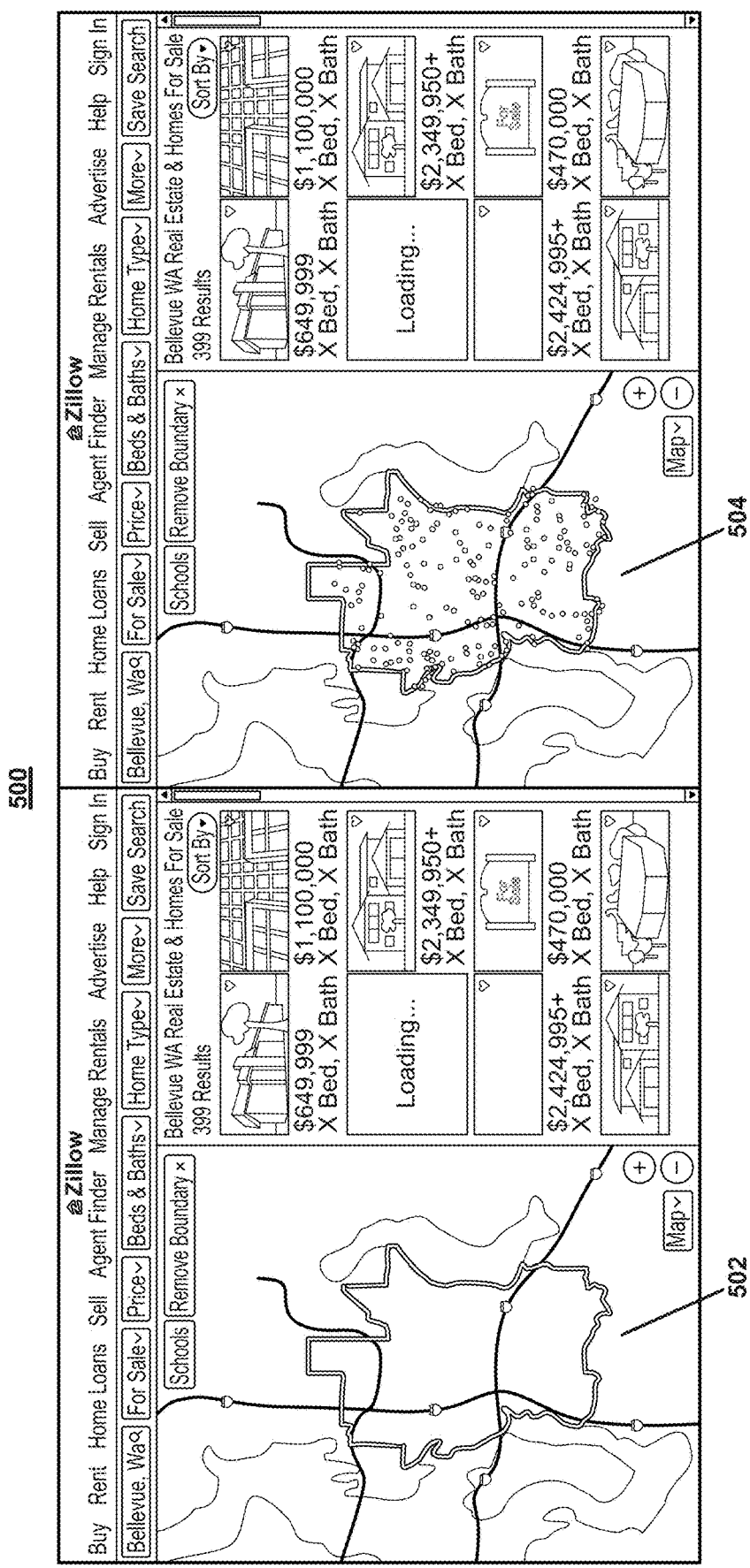
FIG. 5 shows a user interface illustrating static content and dynamic content, in accordance with some implementations of the present technology.

In contrast, the optimized dynamic content loading system presents static content corresponding to the dynamic content during the first time period to improve the user experience as the user begins to see feature rich content sooner. For example, referring to FIG. 5, where the dynamic content is a dynamic geographical map (or other dynamic content), the optimized dynamic content loading system loads and generates for display static content 502, such as an image of the map area requested by the user, and displays the static content 502 corresponding to the dynamic content 504 to the user (e.g., via a user interface) during the first time period. In this way, by loading and presenting the static version of the dynamic content, the optimized dynamic content loading system is able to dramatically improve the performance of webpage load.

A metric typically used to measure webpage loading performance is first contentful paint. By displaying static content corresponding to dynamic content (e.g., during a first time period) and then displaying the dynamic content (e.g., during a second time period), the optimized dynamic content loading system results in significant improvements in utilization of computing resources, such as first contentful paint. For example, based on testing data, as measured from time to first byte (TTFB), the optimized dynamic content loading system results in 38.7% faster first contentful paint; 67.3% faster first listcard; 80.8% faster largest contentful paint; and 17% faster priority UI ready as compared to conventional systems.

At act 308, process 300 obtains the dynamic content. For example, during the first time period, while process 300 is loading the static content, process 300 simultaneously obtains dynamic content (e.g., corresponding to the static content) from one or more data stores (e.g., database 215) responsive to the received user request (e.g., received at act 302). As the webpage continues to load, the optimized dynamic content loading system retrieves (or otherwise obtains), in parallel (or near parallel) with the loading of the webpage, the dynamic content corresponding to the user request. By obtaining the dynamic content in parallel with the loading of the webpage, the optimized dynamic content loading system reduces the amount of time required to present a user with content responsive to the request to load a webpage. For example, as discussed above, conventional systems simply wait for dynamic content to be fully loaded and displayed to a user. However, the optimized dynamic content loading system performs the obtaining of the dynamic content while the static content is being presented to the user, thereby improving the user experience by reducing the amount of time required to present the user with such content.

In some implementations, the user request to load the webpage associated with/comprising the dynamic content comprises a dynamic-content-identifier. For example, while the webpage is loading (e.g., during the first time period), process 300 identifies a corresponding (e.g., a matching) dynamic-content-identifier value stored in the one or more remote data stores (e.g., database 215). As discussed above, the one or more remote data stores can store dynamic content that is associated with (or corresponds to) a dynamic-content-identifier value. Where the user request comprises a dynamic-content-identifier, process 300 may determine a match between the dynamic-content-identifier value included in the user request and a dynamic-content-identifier value stores in the one or more remote data stores to obtain the dynamic content. In other implementations, the user request comprises a static-content-correspondence value. For example, while the webpage is loading, process 300 obtains the dynamic content that corresponds to the static content by using the static-content-correspondence value. As discussed above, the static-content-correspondence value and the dynamic-content-identifier value may be linked (or otherwise associated with one another). As such, where the user request includes the static-content-correspondence value, process 300 uses the static-content-correspondence value to identify a corresponding dynamic-content-identifier value to obtain the dynamic content associated with the static content. For example, process 300 can determine a match between the static-content-correspondence value included in the user request and a static-content-correspondence value stored in the one or more remote data stores. Responsive to a matching of the static-content-correspondence values, process 300 determines a dynamic-content-identifier value that is linked to (or otherwise associated with) the static-content-correspondence value to obtain the dynamic content.

At act 310, process 300 generates for display the dynamic content by displaying the dynamic content over the static content. For instance, process 300 displays the dynamic content over the static content during a second time period by overlaying the dynamic content over the static content. The second time period can correspond to a time period when the dynamic content is obtained and ready to be displayed, for example, at a GUI associated with a user device. For instance, the user interface can be a web-based graphical user interface (GUI) presented via a web-browser (or other user device application) configured to display content at a user device.

In some implementations, the first time period and the second time period are two distinct time periods (e.g., no overlapping). For instance, the first time period ends once all content associated with the webpage, except for the dynamic content, is loaded and displayed. For example, where dynamic content is to be generated, the webpage can include one or more advertisements, images, search results, or other content. When all of the advertisements, images, search results, and other content (including any static content) is loaded and displayed, the first time period ends, and the second time period begins such that the second time period is subsequent to the first time period. In this example, the second time period can end once all content associated with the webpage (including the requested dynamic content) is loaded and displayed to the user. In this way, the optimized dynamic content loading system reduces the amount of computer processing resources required to display the dynamic content as the dynamic content is generated only after resources have been utilized to display the other content (e.g., the static content and other content) associated with the webpage.

In some implementations, the first time period and the second time period overlap such that the second time period begins during a portion of the first time period. For example, as the webpage continues to load (e.g., not finished with loading) and the system loads and presents the static content that corresponds to the dynamic content, the first time period can represent a time period where at least some of the content associated with a webpage (e.g., images, text, videos, scripts, or other content) is not finished loading. The second time period begins once the optimized dynamic content loading system has obtained the dynamic content corresponding to the static content, and can display the dynamic content over the static content during such time period. In such a case, the first time period and the second time period can end at the same time (e.g., where all content associated with the webpage is loaded and displayed to the user).

In some implementations, process 300 can display the dynamic content over the static content by superimposing the dynamic content over the static content. For example, process 300 superimposes the dynamic content (e.g., pixel by pixel, or via other superimposition techniques), over the static content. For instance, by superimposing the dynamic content over the static content, the user experience is improved as the user perceives a resolution improvement as opposed to a jarring (i) reload of the webpage or (ii) "all at once" replacement of static content to dynamic content. As an example, where the dynamic content is a dynamic map and the static content is a static image of the dynamic map, process 300 superimposes, pixel-by-pixel (e.g., at least some pixels, no pixels, or all pixels), the static map image with the dynamic map. Process 300 can perform this replacement such that it is nearly invisible to a user (e.g., the user simply perceives that the resolution of the map improved when the optimized dynamic content loading system replaces the static map with the dynamic map).

In some implementations, the superimposition can be a superimposition of at least some pixels (but not all) of the dynamic content over corresponding pixels of the static content. For example, process 300 may identify mismatching pixels of the static content and the dynamic content. That is, mismatching pixels may be pixels that are located in the same location (e.g., relative to a user interface or user device display) that do not have the same value (e.g., color) respective to the static and dynamic content. For instance, the static and dynamic content may be content which, when presented on a user interface, may indicate pixel values such as colors, shades, or other pixel values to be assigned at one or more pixel locations. Matching pixels of the static content and the dynamic content may be pixels that are located in the same location that have the same color respective to the static and dynamic content. For example, where a user device display includes pixels identifiable by (x,y) coordinates, a matching pixel may be a pixel that is located at (50,65) where both the static content and the dynamic content indicate that the pixel located at (50,65) is assigned to the color blue. As another example, a mismatching pixel may be a pixel located at (40,77) where the static content indicates that the pixel located at (40,77) is assigned a color different from that of the dynamic content (or vice versa). That is, mismatched pixels are pixels that are assigned a different color (or other value) respective to the static and dynamic content. Process 300 can determine mismatching pixels between the static and dynamic content and can superimpose the mismatching pixels of the dynamic content over the static content. In this way, only pixels that need to be changed, respective of the static content and the dynamic content, are be superimposed-thereby reducing the amount of computer processing resources (and energy) required to display dynamic content while improving the user experience.

Figure 6:
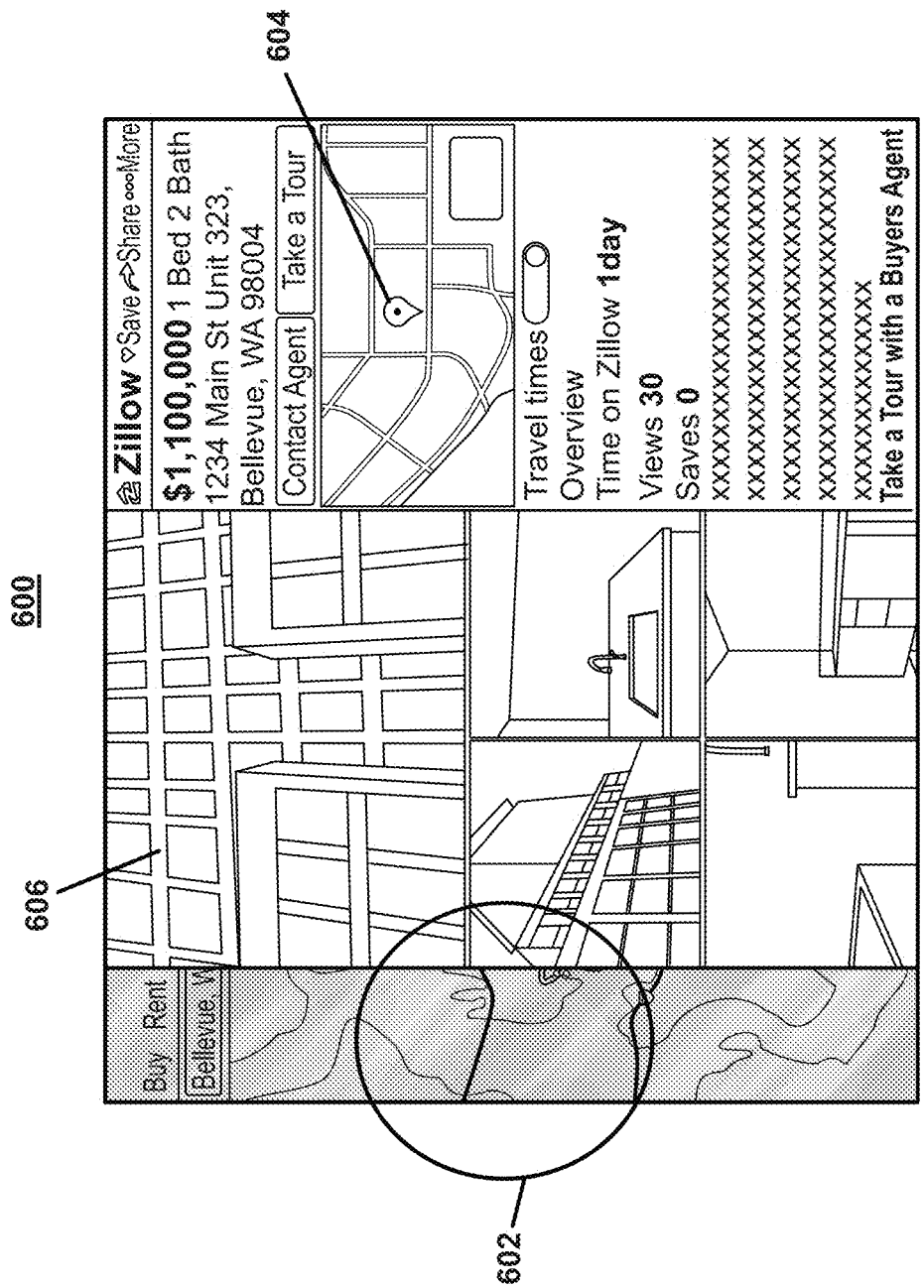
FIG. 6 shows a user interface illustrating dynamic content being presented over other dynamic content, in accordance with some implementations of the present technology.

In some implementations, dynamic content is displayed over other dynamic content. For example, a webpage can include multiple dynamic content portions at once. As a user navigates a webpage that includes first dynamic content, the user may cause second dynamic content to be displayed. As an example, referring to FIG. 6, a user may be interacting with a dynamic geographic map such as first dynamic map 602. However, the user can cause other dynamic content to be displayed on the user interface, such as second dynamic map 604 and dynamic photocards 606. The first dynamic map 602 can be a dynamic map of a large geographic area that is associated with the user's location, such as a state. The second dynamic map 604 can be a dynamic map of a smaller geographic area (as compared to first dynamic map 602) that is associated with the user's location, such as a city. Lastly, the dynamic photocards 606 can be a dynamic photos that are associated with a selected address. However, to reduce computer processing resources utilized on dynamic content that are not within view of a user on a user interface, the optimized dynamic content loading system updates the non-visible dynamic content with static content.

For example, since dynamic content changes based on user specific information (e.g., the location of a user), dynamic content can be continuously updated. As an example, with respect to a dynamic map, as the user moves throughout a city, the dynamic map is updated to reflect the user's current location, thereby causing numerous API calls to the remote database (e.g., database 215) to obtain the user's current location and subsequently update the dynamic map. Although the user experience is improved in this way, in some cases, these precious resources are wasted if the dynamic map is not within view (e.g., hidden behind other content) of the user via a user interface. For instance, as measured based on testing data by replacing the dynamic content with static versions of the dynamic content, the optimized dynamic content loading system results in savings of page load size (from 10.1 MB of that of conventional systems to 7.8 MB of that of the optimized dynamic content loading system), which further results in faster page loads, reduced CPU time, reduced memory resources, and reduced network resource usage.

Therefore, when second dynamic content (or a portion thereof) is generated for display over other dynamic content, process 300 can update the other dynamic content (e.g., the dynamic content that is hidden from the user's view) with static content corresponding to the dynamic content which is hidden. For example, in some implementations, based on the detection of second dynamic content being displayed over first dynamic content, process 300 accesses the remote data store (e.g., database 215) to obtain static content that corresponds to the first dynamic content over which the second dynamic content is being displayed. Process 300 can then generate for display, on a user interface of a user device associated with the user, the static content that corresponds to the first dynamic content to conserve computing, network, and processing resources.

In some implementations, process 300 can update content. For example, as user specific data may change constantly, such as the location of the user, customized email preferences of the user (e.g., a font color preference, a font size preference, a signature), medical records of a user, static and dynamic content can also be updated to reflect such changes. For instance, the user specific data may include a set of user specific data items. Each user specific data item may indicate a user preference of the user, information about the user (e.g., demographical information, medical information, economic information, location information, etc.), a name of the user, or other information. Additionally, dynamic content can include a set of dynamic items where each dynamic item of the set of dynamic items correspond to a user specific data item. For example, where the user specific data item is a signature of a user (e.g., an email signature), a dynamic item may be a visual representation of the signature of the user that changes based on a user's update of the user specific data item. As another example, where the user specific data item is the current location of the user, a dynamic item can be a pin drop on a geographic map indicating the current location of the user. Similarly, static content may include a set of static item, where each static item corresponds to a dynamic item of the set of dynamic items. For example, where the dynamic item is the pin drop on a geographic map, the static item may be a static image of the pin drop on the geographic map. Such relationships between the user specific data, the dynamic content, and the static content can be used to improve the user experience when loading dynamic content where such static and dynamic content is updated based on an update of user specific information.

Figure 7:
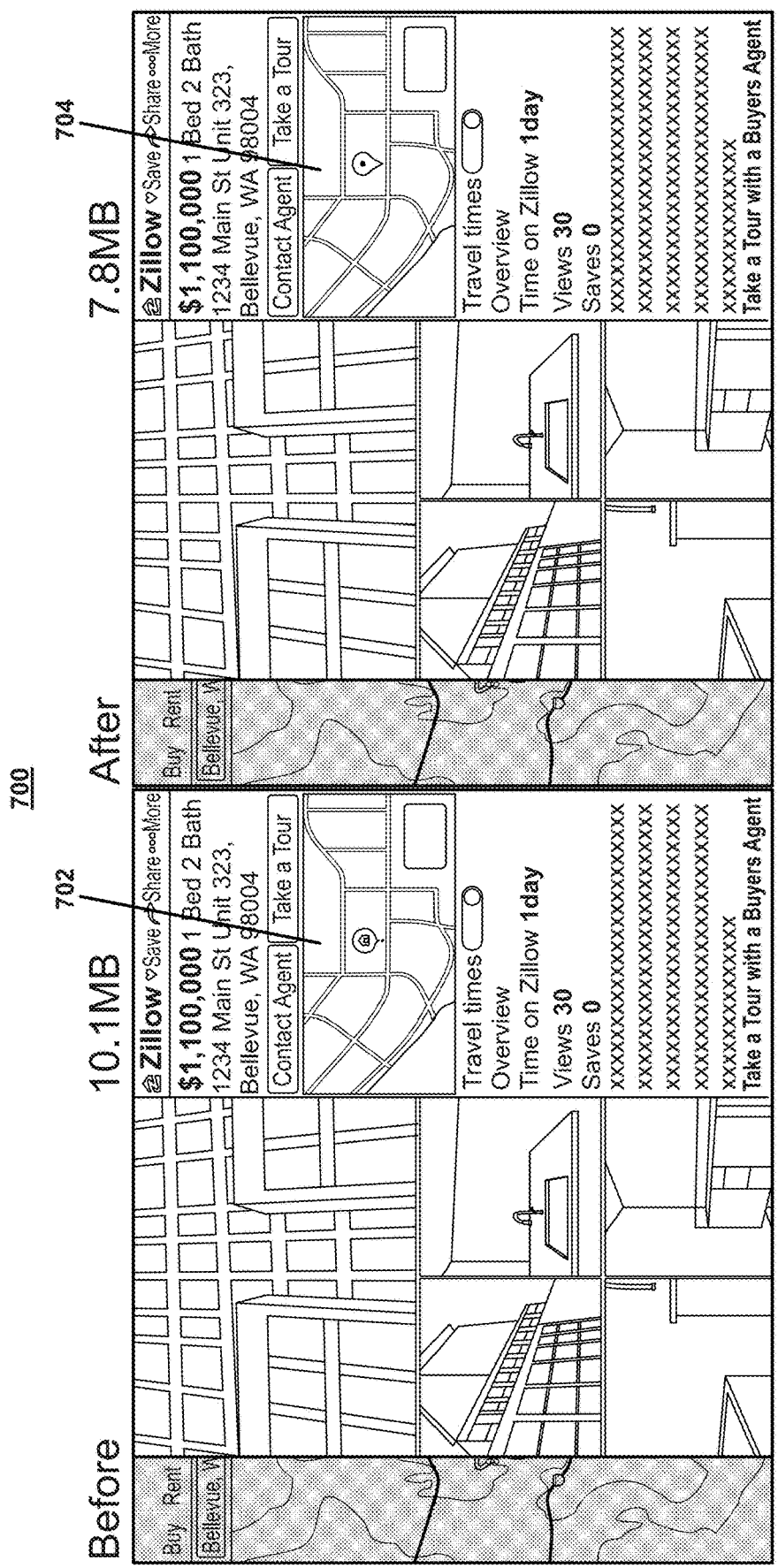
FIG. 7 shows a user interface illustrating updating static content and dynamic content, in accordance with some implementations of the present technology.

Process 300 can detect an update to a user specific data item. For example, server 210 monitors update requests transmitted between a user device (e.g., client device 205) and the remote database (e.g., database 215) to detect whether a user specific data item is being updated. Based on the detection, process 300 updates static content such that the static content includes an updated static item corresponding to the updated user specific data item. Similarly, based on the detection, process 300 updates dynamic content such that the dynamic content includes an updated dynamic item corresponding to the updated user specific data item. In one use case, referring to FIG. 7, process 300 detects an update to the user's current location. For instance, static map 702 is static content corresponding to dynamic map 704. Upon process 300 detecting an update to the user's current location, process 300 updates static map 702 to include the user's updated location (e.g., as indicated by the circle) to reflect the users updated current location. Similarly, process 300 can also, upon detection of the update of the user's current location, update dynamic map 704 to include the user's updated location (e.g., as indicated by the pin). Additionally, when dynamic content is obscured (e.g., hidden or out of view) and such dynamic content is replaced with static content, such static content can also be updated with updated static content to reflect any changes that may have occurred (e.g., with respect to user specific information) to create a seamless user experience. In this way, the user experience is improved by updating content to reflect any updated user specific data.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

I claim:

1. A system for optimizing dynamic content loading, the system comprising:
   at least one processor;
   a remote data store storing:
   dynamic web-based content corresponding to static web-based content, wherein (i) the dynamic web-based content is a dynamic geographic map based on user specific data and (ii) the static web-based content is a static image of the geographic map;
   at least one memory coupled to the at least one processor and storing instructions that, when executed by the at least one processor, cause the system to perform operations comprising:
   receiving, from a remote computing system, a user request to load a webpage that comprises dynamic web-based content;
   determining an identifier associated with the user request;
   comparing the identifier to identifiers stored in the remote data store to identify the dynamic geographic map;
   accessing the remote data store to store to obtain the static image of the geographic map that corresponds to the identified dynamic geographic map;
   generating for display, at the remote computing system, during a first time period, the static content that corresponds to the dynamic web-based content,
   wherein the static content is displayed on a user interface at the remote computing system during the first time period;
   accessing the remote data store during the first time period to obtain the dynamic web-based content corresponding to the static web-based content;
   during a second time period, generating, for display at the remote computing system, the dynamic web-based content by identifying locations of mismatching pixels between the dynamic web-based content and the static content and superimposing pixels of the dynamic web-based content over pixels of the static content at the locations of mismatching pixels;
   displaying, at the remote computing system, second dynamic web-based content that covers the dynamic web-based content, such that the dynamic web-based content is at least partially hidden from view; and
   during display of the second dynamic web-based content, replacing the dynamic web-based content with the static content corresponding to the dynamic web-based content.

2. The system of claim 1, wherein the user specific data indicates a location of the user, and wherein the dynamic geographic map indicates a geographical region corresponding to the location of the user.

3. The system of claim 1, wherein generating, for display, at the remote computing system, the dynamic web-based content by superimposing the dynamic web-based content over the static web-based content is automatically performed after the first period of time without receiving a user input selecting the static web-based content.

4. The system of claim 1, the operations further comprising:
   during display of the dynamic web-based content, continuously updating the dynamic web-based content based on a location of the user; and
   stopping updating of the dynamic web-based content after replacing the dynamic web-based content with the static content corresponding to the dynamic web-based content.

5. A method for optimizing dynamic content loading, comprising:
   receiving a user request to load a webpage comprising dynamic content associated with user specific data;
   obtaining static content corresponding to the dynamic content;
   prior to displaying the requested dynamic content, generating for display, during a first time period, the static content associated with the dynamic content, wherein the status content is displayed on a user interface during the first time period;
   accessing a remote data store to obtain the dynamic content corresponding to the static content;
   generating, for display, during a second time period different from the first time period, the dynamic content by identifying locations of mismatching pixels between the dynamic web-based content and the static content and superimposing pixels of the dynamic web-based content over pixels of the static content at the locations of mismatching pixels, displaying the dynamic content over the static content, wherein the dynamic content is displayed on the user interface during the second time period;
   displaying second dynamic content that covers the dynamic content, such that the dynamic content is at least partially hidden from view; and
   during display of the second dynamic content, replacing the dynamic content with the static content corresponding to the dynamic content.

6. The method of claim 5, wherein obtaining the static content associated with the dynamic content further comprises:
   determining, based on the user request, an identifier associated with the request;
   comparing the identifier associated with the request to other identifiers associated with the dynamic content to determine a match; and
   obtaining, based on the matching, the static content associated with the dynamic content.

7. The method of claim 5, wherein the user specific data comprises at least a location, name, demographic information, or financial information.

8. The method of claim 5, wherein the static content is an image associated with the dynamic content.

9. The method of claim 5, wherein (i) the user specific data includes a set of user specific data items, (ii) the dynamic content includes a set of dynamic items wherein each dynamic item of the set of dynamic items corresponds to a user specific data item of the set of user specific data items, respectively, and (iii) the static content includes a set of static items, and wherein each static item of the set of static items corresponds to a dynamic item of the set of dynamic items, respectively.

10. The method of claim 9, further comprising:
    detecting an update to at least one user specific data item of the set of user specific data items; and updating, based on the detection, the static content, wherein the updated static content comprises an updated static item corresponding to the updated user specific data item.

11. The method of claim 9, further comprising:
detecting an update to at least one user specific data item of the set of user specific data items; and
updating, based on the detection, the dynamic content, wherein the updated dynamic content comprises an updated dynamic item corresponding to the updated user specific data item.

12. One or more non-transitory computer-readable media comprising instructions that, when executed by one or more processors, cause operations for optimizing dynamic content loading, the operations comprising:
receiving a user request to load a webpage associated with dynamic content, wherein the dynamic content is associated with user specific data;
obtaining static content associated with the dynamic content;
prior to displaying the requested dynamic content, generating for display, during a first time period, the static content associated with the dynamic content, wherein the static content is displayed on a user interface during the first time period;
accessing a remote data store to obtain the dynamic content corresponding to the static content;
generating, for display, during a second time period different from the first time period, the dynamic content by identifying locations of mismatching pixels between the dynamic content and the static content and superimposing pixels of the dynamic content over pixels of the static content at the locations of mismatching pixels, wherein the dynamic content is displayed on the user interface during the second time period;
displaying second dynamic content that covers the dynamic content, such that the dynamic content is at least partially hidden from view; and
during display of the second dynamic content, replacing the dynamic content with the static content corresponding to the dynamic content.

13. The media of claim 12, the operations further comprising:
determining, based on the user request, an identifier associated with the request;
comparing the identifier associated with the request to other identifiers associated with the dynamic content to determine a match; and
obtaining, based on the matching, the static content associated with the dynamic content.

14. The media of claim 12, wherein the wherein the user specific data comprises at least a location, name, demographic information, or financial information.

15. The media of claim 12, wherein the static content is an image associated with the dynamic content.

16. The media of claim 12 wherein (i) the user specific data includes a set of user specific data items, (ii) the dynamic content includes a set of dynamic items wherein each dynamic item of the set of dynamic items corresponds to a user specific data item of the set of user specific data items, respectively, and (iii) the static content includes a set of static items, and wherein each static item of the set of static items corresponds to a dynamic item of the set of dynamic items, respectively.

17. The media of claim 16, the operations further comprising:
detecting an update to at least one user specific data item of the set of user specific data items; and
updating, based on the detection, the static content, wherein the updated static content comprises an updated static item corresponding to the updated user specific data item.

18. The media of claim 16, the operations further comprising:
detecting an update to at least one user specific data item of the set of user specific data items; and
updating, based on the detection, the dynamic content, wherein the updated dynamic content comprises an updated dynamic item corresponding to the updated user specific data item.

* * * * *